US008305717B2

(12) United States Patent
Parker et al.

(10) Patent No.: US 8,305,717 B2
(45) Date of Patent: Nov. 6, 2012

(54) LED MODULES FOR SIGN CHANNEL LETTERS AND DRIVING CIRCUIT

(75) Inventors: Francis Parker, Cooper City, FL (US); Robert Crawbuck, Jupiter, FL (US); Emilian Padurariu, West Palm Beach, FL (US)

(73) Assignee: Inshore Holdings, LLC, Miami, FL (US)

( * ) Notice: Subject to any disclaimer, the term of this patent is extended or adjusted under 35 U.S.C. 154(b) by 0 days.

(21) Appl. No.: 12/971,381

(22) Filed: Dec. 17, 2010

(65) Prior Publication Data

US 2011/0085271 A1 Apr. 14, 2011

Related U.S. Application Data

(62) Division of application No. 12/283,141, filed on Sep. 9, 2008.

(51) Int. Cl.
*H02H 3/00* (2006.01)

(52) U.S. Cl. .................... 361/42

(58) Field of Classification Search .................... 361/42, 361/45, 49, 54, 56, 111; 315/121, 122, 123, 315/125, 185 R, 312; 362/612, 656, 630, 362/555, 631
See application file for complete search history.

(56) References Cited

U.S. PATENT DOCUMENTS

| | | | | | |
|---|---|---|---|---|---|
| 1,024,495 | A | | 4/1912 | Booth | |
| 1,510,847 | A | | 10/1924 | Holler | |
| 2,461,962 | A | | 2/1949 | Carlson | |
| 2,484,596 | A | | 10/1949 | Walz | |
| 2,760,120 | A | | 8/1956 | Fisherman | |
| 2,870,377 | A | | 1/1959 | Ourekik | |
| 3,229,163 | A | * | 1/1966 | Rogers, Sr. | 361/49 |
| 3,287,603 | A | * | 11/1966 | Sosnoski | 361/49 |
| 3,345,482 | A | | 10/1967 | Lou | |
| 3,436,599 | A | * | 4/1969 | Rogers, Sr. | 361/49 |
| 3,515,942 | A | * | 6/1970 | Gordon | 361/49 |
| 3,535,585 | A | | 10/1970 | Barnum | |
| 3,639,805 | A | | 2/1972 | Meunch | |
| 3,757,169 | A | * | 9/1973 | Beresnikow | 361/49 |
| 3,868,665 | A | * | 2/1975 | Treglown | 340/651 |
| 3,912,966 | A | | 10/1975 | Harnden | |
| 3,947,759 | A | * | 3/1976 | Briggs | 324/509 |
| 3,969,711 | A | * | 7/1976 | Ahntholz | 340/651 |
| 4,450,382 | A | | 5/1984 | Sawaka | |
| 4,727,449 | A | | 2/1988 | Fleek | |
| 5,453,664 | A | | 9/1995 | Harris | |
| 5,886,423 | A | | 3/1999 | Gershen | |
| 6,084,357 | A | | 7/2000 | Janning | |
| 6,153,980 | A | | 11/2000 | Marshall | |

(Continued)

FOREIGN PATENT DOCUMENTS

DE 202005002173 6/2005

(Continued)

*Primary Examiner* — Stephen W Jackson
(74) *Attorney, Agent, or Firm* — Lucas & Mercanti, LLP; Peter J. Phillips

(57) ABSTRACT

An LED module for use in sign letter channel lights comprises a substrate, a reflector mounted on the substrate, an LED mounted within the reflector on the substrate and a Zener diode shunt element connected in parallel across the LED, a printed circuit board on the substrate, wherein the LED is mounted on the printed circuit board, and an insulating cover. The module may be entirely encapsulated. An LED driving protection circuit provides ground fault protection for a plurality of series connected LED modules.

5 Claims, 5 Drawing Sheets

U.S. PATENT DOCUMENTS

| | | | | |
|---|---|---|---|---|
| 6,203,180 | B1 | 3/2001 | Fleischmann | |
| 6,304,039 | B1 * | 10/2001 | Appelberg et al. | 315/169.3 |
| 6,323,597 | B1 | 11/2001 | Janning | |
| 6,344,716 | B1 | 2/2002 | Gibboney | |
| 6,478,450 | B1 | 11/2002 | Grajcar | |
| 6,558,021 | B2 | 5/2003 | Wu et al. | |
| 6,577,072 | B2 | 6/2003 | Saito | |
| 6,580,182 | B2 | 6/2003 | Janning | |
| 6,597,125 | B2 | 7/2003 | Janning | |
| 6,660,935 | B2 | 12/2003 | Southard et al. | |
| 6,765,313 | B2 | 7/2004 | Janning | |
| 6,860,621 | B2 | 3/2005 | Bachl et al. | |
| 6,911,731 | B2 | 6/2005 | Wu | |
| 6,932,495 | B2 | 8/2005 | Sloan et al. | |
| 7,042,116 | B2 | 5/2006 | Janning | |
| 7,086,758 | B2 | 8/2006 | Janning | |
| 7,114,841 | B2 | 10/2006 | Aanegola et al. | |
| 7,160,140 | B1 | 1/2007 | Mrakovich et al. | |
| 7,166,968 | B2 | 1/2007 | Janning | |
| 7,210,957 | B2 | 5/2007 | Mrakovich et al. | |
| 7,217,005 | B2 | 5/2007 | Lin | |
| 7,217,012 | B2 | 5/2007 | Southard et al. | |
| 7,233,115 | B2 * | 6/2007 | Lys | 315/291 |
| 7,241,031 | B2 | 7/2007 | Sloan et al. | |
| 7,751,161 | B2 * | 7/2010 | Williams | 361/42 |
| 7,832,896 | B2 | 11/2010 | Saha et al. | |
| 2002/0043943 | A1 | 4/2002 | Menzer et al. | |
| 2007/0273296 | A9 | 11/2007 | Janning | |
| 2009/0204239 | A1 * | 8/2009 | Netzel et al. | 700/83 |

FOREIGN PATENT DOCUMENTS

| | | |
|---|---|---|
| WO | 9729320 | 8/1997 |

* cited by examiner

Fig. 2E (A-A)

LED MODULES FOR SIGN CHANNEL LETTERS AND DRIVING CIRCUIT

CROSS-REFERENCE TO RELATED APPLICATIONS

This application is a divisional of U.S. patent application Ser. No. 12/283,141 filed Sep. 9, 2008, which is incorporated by reference herein.

BACKGROUND OF THE INVENTION

The present invention relates to light emitting diode (LED) light systems for channel letters in signs, particularly to LED systems serially connected with shunts for each LED, and circuits for driving the LEDs which provide circuit safety protection, and to provide an LED module for series connection with other LED modules.

LEDs have become very popular for providing illumination in the sign industry due to their superior efficiency compared to incandescent and fluorescent bulbs, and the avoidance of harmful mercury in fluorescent bulbs. LEDs are also smaller and generally easier to ship, store and install than the prior light sources. Advancements in LED technology have also made LEDs even more desirable.

LEDs have been used in parallel circuits in the sign industry, but a disadvantage is that increased current is required to drive them in parallel. Such systems typically use a low voltage, high current class 2 power supply.

In the parallel LED connection arrangement, the low voltage power supply must have wires to carry the total current of all LEDs operating from one power supply. The total current could be as high as 5 amps, requiring heavy gauge wire of higher cross-section which adds to cost. Also, the power losses due to IR drops in the wires become significant. The use of higher total currents also presents a safety issue.

The conventional parallel LED system using a constant low voltage power supply requires that some ballasting means be provided to limit the current into the parallel connected LEDs to prevent excessive change in operating current with temperature variations and as a result of manufacturing tolerance. These ballasting means all dissipate additional power to some degree over and above that required for operation of the LEDs. The provision of a ballasting means is an additional cost in the manufacturing, and also results in additional cost in operation due to the waste of power. Also, the ballasting means can also fail during operation.

While it is possible to connect the LEDs in series, rather than in parallel, to avoid many of the problems of parallel connection discussed above, the single path series arrangement has a disadvantage in that a failure of one LED in the series would cause an open circuit in the single path, with the result that none of the still operative, non-failed LEDs would continue to be lit. Because none of the operative LEDs would be illuminated, it is difficult and time consuming to identify the failed LED to replace it. Also, a failure of even one LED would result in downtime of the entire circuit, which may come at an in opportune time. The entire system would be inoperative until troubleshooting is performed by service personnel, which may be costly especially if the repair needs to be done immediately, or after business hours. Once the failed LED is identified, replacement typically requires cutting the wire and hard-wiring in the replacement LED.

SUMMARY OF THE INVENTION

The invention in a preferred embodiment may provide one or more of the following objectives. However, an embodiment need not necessarily achieve any of these objectives.

An object of the present invention is to provide an LED lighting system for sign channel letters whereby LEDs are connected in series to avoid high current driving requirements.

An object of the present invention is to provide shunts in parallel with the LEDs so that the current path is maintained when an LED fails, so that the remaining LEDs not only provide their desired lighting function, but also so that the defective LED can be easily identified and replaced.

An object of the present invention is to provide a ground fault interruption (GFI) circuit in combination with a LED series light string to disable the power delivered should a fault occur with the external LED load or its connections.

An object of the present invention is to provide an output signal for driving the LED light string which has a balanced output relative to ground to minimize the terminal voltage seen by the system relative to ground.

An object of the present invention is to provide overload protection to ensure that the user will not overload the system by running an excessive number of LED modules on one string.

An object of the present invention is to provide an LED module to enable easy installation of an LED in a circuit, and provide easy removal and replacement of a failed LED in the circuit.

The invention provides an LED module for use in a lighting circuit for illumination of channel letters in a sign and having LED modules connected in series to a source of constant current, comprising a substrate, an electrical circuit mounted on the substrate, said electrical circuit consisting essentially of an LED and a shunt element connected in parallel with the LED, the electrical circuit having two electrical connection points for connecting the LED module to other modules in a series circuit.

The invention provides an LED lighting system for illumination of channel letters in a sign comprising a circuit having a plurality of LED modules connected in series to a source of constant current, each LED module being removable and replaceable within the circuit, each LED module comprising an LED connected in parallel with a shunt element.

The invention provides an LED lighting system comprising a plurality of LED modules connected in series to a source of constant current, comprising a substrate, a reflector mounted on the substrate, and an electrical circuit mounted on the substrate, said electrical circuit consisting essentially of an LED mounted within the reflector on the substrate and a Zener diode shunt element connected in parallel across the LED.

The invention provides an LED lighting system, comprising an LED circuit having a plurality of LEDs connected in series and connectable to a source of constant current, and a ground fault detecting circuit for detecting the presence of a ground fault condition in the LED circuit, and in response to a ground fault condition being detected, for disconnecting the LED circuit from the source of constant current.

The invention provides an LED driving protection circuit for providing ground fault protection for a series LED circuit, comprising an output circuit for outputting power to drive an LED circuit of series connected LEDs, and for outputting a output voltage signal at a reference voltage potential, said voltage potential remaining substantially constant in the absence of a ground fault in the LED circuit, but which changes from the reference voltage potential if a ground fault exists in the LED circuit, and a comparator circuit for detecting when the output voltage signal changes from the reference voltage potential, and in response produces an inhibit signal which disables the output circuit from outputting power to drive the LED circuit.

BRIEF DESCRIPTION OF THE DRAWINGS

FIG. 2E is a cross-sectional side view of the module of FIGS. 2A-2D;

DESCRIPTION OF THE PREFERRED EMBODIMENTS

Figures 1A, 1B, 1C, 1D, 1E, 1F, 1G:
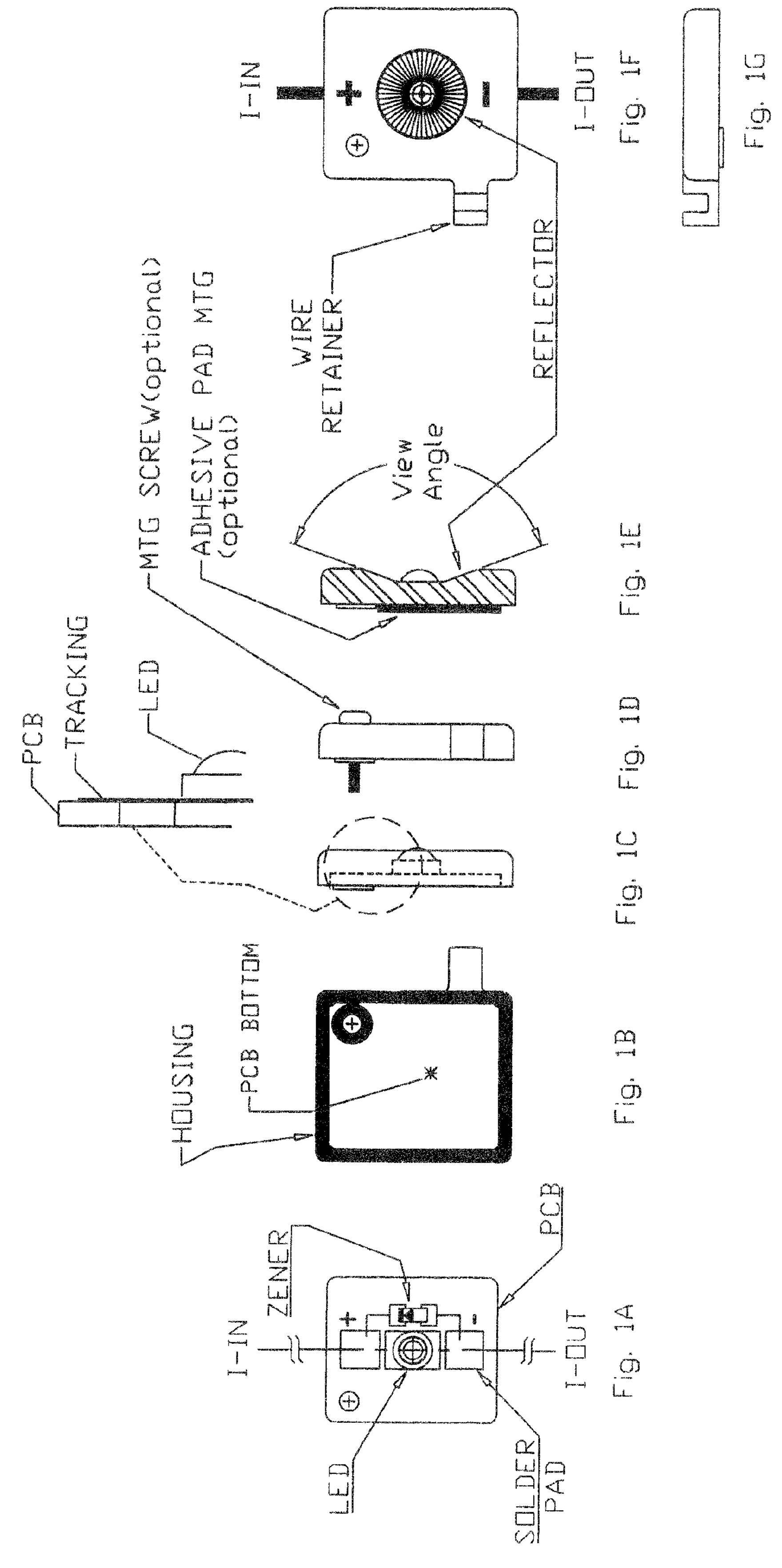
FIG. 1A is a plan view of an LED module according to an embodiment of the invention.
FIG. 1B is a bottom view of the housing of the module.
FIG. 1C is a side view of the module of FIG. 1B, excluding the housing cover.
FIG. 1D is a side view of the module housing cover.
FIG. 1E is a cross-sectional side view of the module taken along line A-A of FIG. 1F.
FIG. 1F is a top plan view of the module, excluding the housing cover.
FIG. 1G is a side elevation view of the module with the housing cover.

The invention provides an LED module for use in a lighting circuit for illumination of channel letters in a sign and having LED modules connected in series to a source of constant current, comprising a substrate, an electrical circuit mounted on the substrate, said electrical circuit consisting essentially of an LED and a shunt element connected in parallel with the LED, the electrical circuit having two electrical connection points for connecting the LED module to other modules in a series circuit.

The substrate may be mounted in a housing, and the module may further comprise a clip on the exterior of the housing for accepting and mounting a return power wire. The shunt element may be a Zener diode. The substrate may include a heat sink for dissipating heat. The substrate may include at least one mounting region at an edge for mounting the module. The mounting region may comprise at least one of a notch and a hole. The module may include an insulating cover. The insulating cover may be molded onto the module. The module may include a heat sink, a printed circuit board on the insulator, and wherein the LED is mounted on the printed circuit board. The module may include a reflector in which the LED is mounted.

The invention provides an LED lighting system for illumination of channel letters in a sign comprising a circuit having a plurality of LED modules connected in series to a source of constant current, each LED module being removable and replaceable within the circuit, each LED module comprising an LED connected in parallel with a shunt element.

The substrate may be mounted in a housing, and the module may further comprise a clip on the exterior of the housing for accepting and mounting a return power wire. The LED modules may be connected using double insulated wire. The shunt element may be a Zener diode. The substrate may include a heat sink for dissipating heat. The substrate may include at least one mounting region at an edge for mounting the module. The mounting region may comprise at least one of a notch and a hole. The module may include an insulating cover. The insulating cover may be molded onto the module. The module may include a heat sink, a printed circuit board on the insulator, and wherein the LED is mounted on the printed circuit board.

The invention provides an LED lighting system comprising a plurality of LED modules connected in series to a source of constant current, comprising a substrate, a reflector mounted on the substrate, and an electrical circuit mounted on the substrate, said electrical circuit consisting essentially of an LED mounted within the reflector on the substrate and a Zener diode shunt element connected in parallel across the LED.

The invention provides an LED lighting system, comprising an LED circuit having a plurality of LEDs connected in series and connectable to a source of constant current, and a ground fault detecting circuit for detecting the presence of a ground fault condition in the LED circuit, and in response to a ground fault condition being detected, for disconnecting the LED circuit from the source of constant current.

The LEDs may be connected with double insulated wire.

The invention provides an LED driving protection circuit for providing ground fault protection for a series LED circuit, comprising an output circuit for outputting power to drive an LED circuit of series connected LEDs, and for outputting a output voltage signal at a reference voltage potential, said voltage potential remaining substantially constant in the absence of a ground fault in the LED circuit, but which changes from the reference voltage potential if a ground fault exists in the LED circuit, and a comparator circuit for detecting when the output voltage signal changes from the reference voltage potential, and in response produces an inhibit signal which disables the output circuit from outputting power to drive the LED circuit.

The output circuit may comprise a first transformer having a primary terminal connected to receive an AC current source, secondary terminals, and a rectifier bridge connected to the secondary terminals for outputting DC power to drive the LED circuit, said first transformer having an output center tap for providing the reference voltage potential. The comparator circuit may comprise a bridge rectifier for producing rectified current, an opto isolator to receive the rectified current, and a comparator connected to an output of the opto isolator and the reference voltage potential, and for outputting the inhibit signal when the voltage from the secondary terminals exceeds the reference voltage potential.

Embodiments of an LED module for use in lighting channel letters in signs, and of a driving circuit with circuit protection for such modules, will be described by way of examples, but the invention is not limited to these examples or embodiments.

FIG. 1A shows an LED module 10 according to an embodiment of the invention. The module 10 comprises a substrate in the form of a printed circuit board (PCB) 12, onto which an LED 14 is mounted centrally within the base of a parabolic reflector 16. The LED is connected electrically to positive (+) and negative (−) terminals as shown. Connected in parallel with the LED is Zener diode 18.

The module 10 has an exterior housing base 20 with the PCB 12 mounted in the center as shown in FIG. 1B. The housing base 20 may have aluminum in the center at the bottom of the PCB 12 to serve as a heat sink.

The base 20 may have one or more holes 22 to mount the housing to a surface for installing the module by means of a screw or other connector. The base may have a side notch so that the module may be rotated around the mounting hole and accept another connector such as a screw. In addition or in the alternative, the module may be mounted using an adhesive pad as shown in FIG. 1E, using a peel-away layer to protect the adhesive until installation.

FIG. 1D shows a completed module from a side profile and FIG. 1E shows the same view but in cross-section. In FIG. 1F the positive and negative terminals are shown each having a wire connector 30A, 30B.

The wire connectors enable attachment of the module to wires using insulation displacement technology (IDT), without having to strip the wire. Alternately, solder connections may be made for the module interconnecting wires. The module needs connection to only two wires, namely the + and − terminals.

As shown in FIGS. 1D and 1E, the parabolic reflector projects the light from the LED into a region of space depicted by the 90° view angle shown.

An insulating snap-on housing cover may be attached to the top of the module as shown in FIGS. 1D and 1G. The cover has a central hole to permit the light from LED to project outward.

Figure 1H:
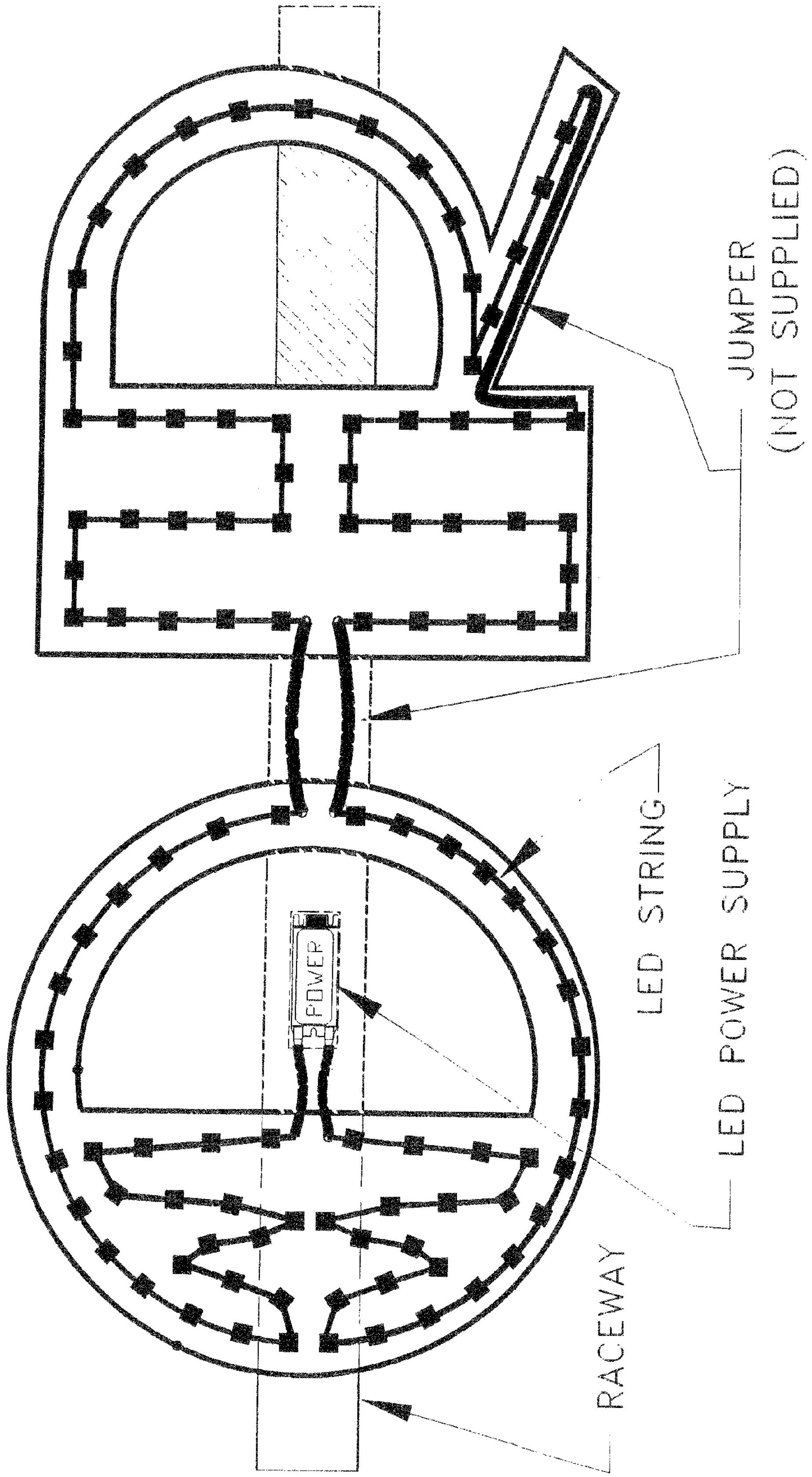
FIG. 1H is a plan view showing a plurality of LED modules connected in series in a channel letter sign.

FIG. 1H shows a plurality of LED modules connected in series in a channel letter sign. This application provides advantages of a dependable lighting system, at relatively low cost, minimal components, and low operating and maintenance while still providing a high illumination system.

In an alternate embodiment shown in FIGS. 2A-2G, the housing may be molded onto the substrate, by encapsulating the entire module, including the printed circuit board (PCB), in an encapsulant material, such as a plastic molding material. One example of encapsulant material is PBT. The embodiment of FIGS. 2A-2G shows a wire retainer or wire clip on the side of the module to accommodate a return wire from a power supply (or LED driver). The embodiment of FIGS. 2A-G is similar in other respects to the embodiment of FIGS. 1A-1G.

Figures 2A, 2B, 2C, 2D, 2F, 2G:
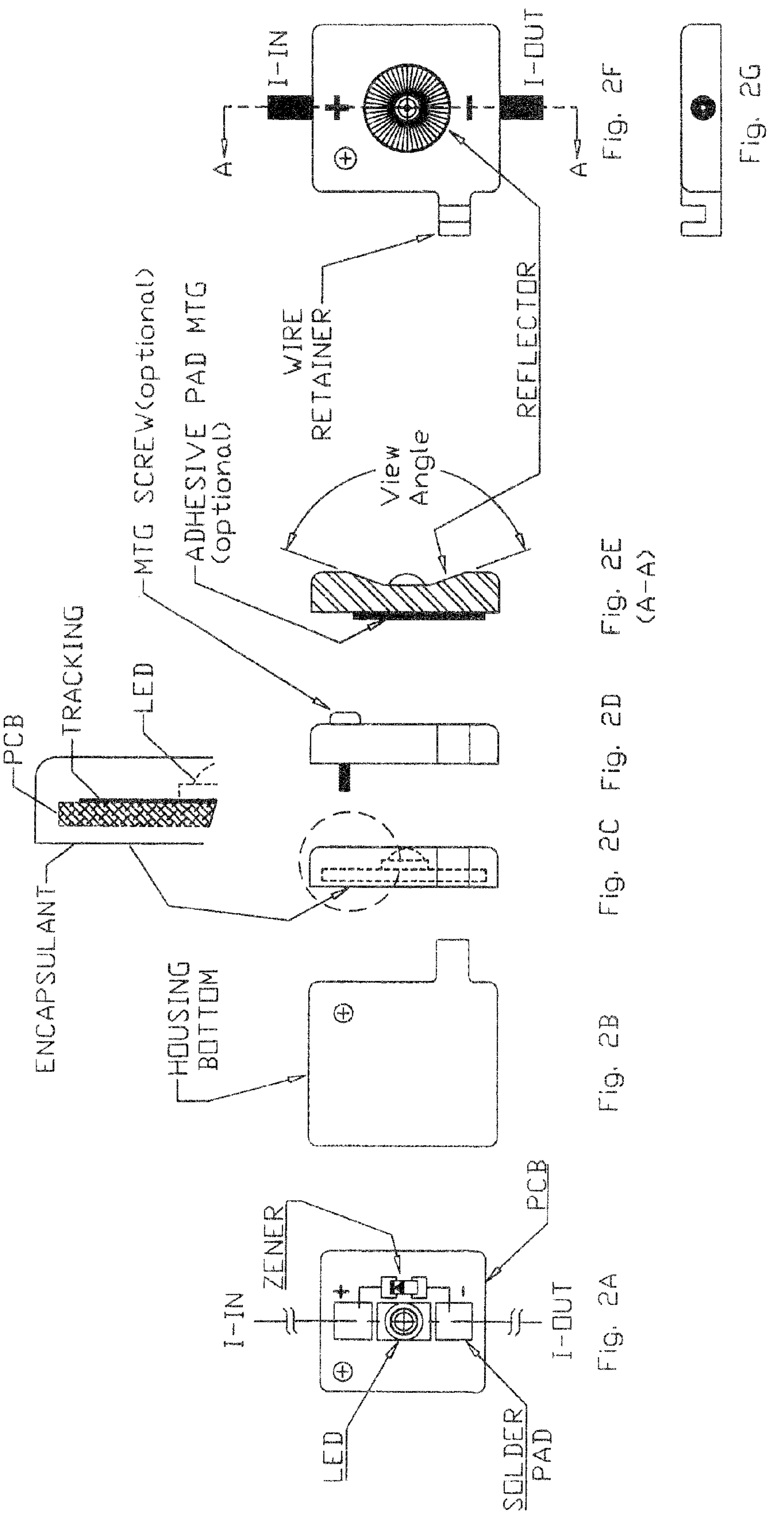
FIG. 2A is a plan view of an LED module according to another embodiment of the invention with an encapsulant material enclosing the module.
FIG. 2B is a bottom view of the housing of the module according to the embodiment of FIG. 2A.
FIG. 2C is a side view of the module of FIGS. 2A-2B, showing the internal structure in hidden lines.
FIG. 2D is a side view of the module of FIGS. 2A-2C, similar to FIG. 2C but without hidden lines.
FIG. 2F is a top plan view of the module of FIGS. 2A-2E.
FIG. 2G is a side elevation view of the module of FIGS. 2A-2F.
Figure 2H:
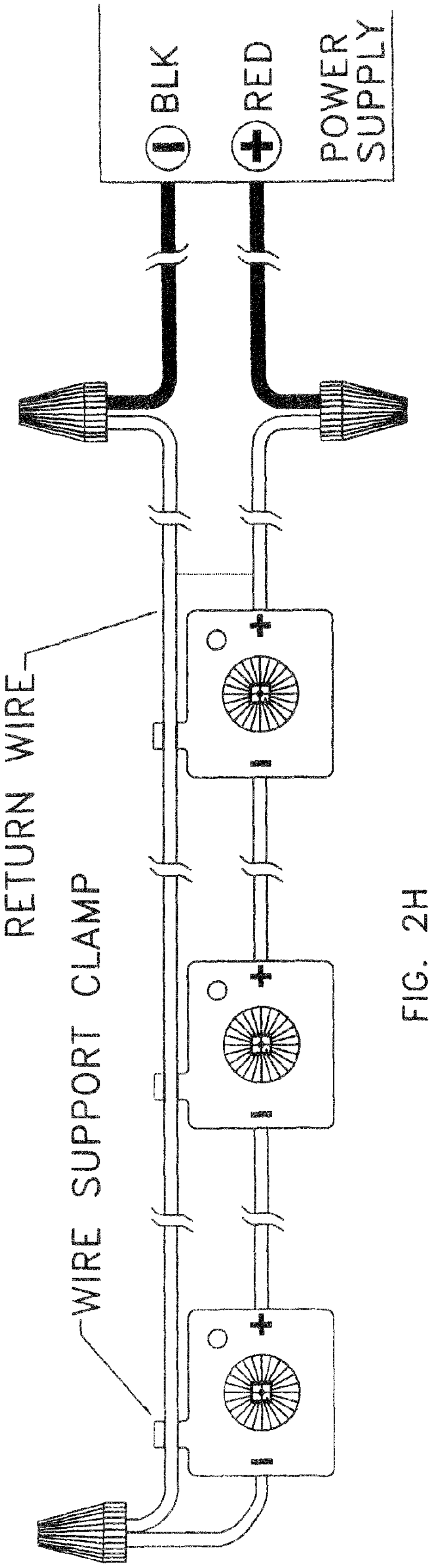
FIG. 2H is a plan view showing a plurality of LED modules connected in series to an LED driver or power supply, with one power wire shown attached to the wire retainer of each module.

As shown in FIG. 2H, which shows a plurality of modules connected in series, the wire retainer or clip holds the return power wire from the power source. The wires may be double insulated by using wires with an integral sleeve, or sleeve which is added. The insulation provides a safety feature. Features of the embodiment of FIGS. 1A-1G may be used in the embodiment of FIGS. 2A-2G, and vice versa.

In the event of an open circuit due to the failure of the LED, current will still flow through the module through the parallel-connected Zener diode. For modules connected in serial fashion, any remaining modules will still be lit and current will continue to flow, allowing any faulty LED to be identified and replaced.

The dielectric withstand voltage between the LED circuit and a conductive mounting surface, or between the LED circuit and the aluminum heatsink attached to the substrate may be on the order of 2500V. In view of the high dielectric withstand voltage, a ground connection for each LED module need not be provided, and the interconnection of the module to the circuit wires requires only two wire connection. However, if the module is mounted to a metal surface such as a channel letter enclosure, the enclosure may be grounded.

The LED modules may be provided to installers already connected in a string, and wound onto a reel for shipping and storage. The required length for a particular installation application may simply be removed from the reel.

Reels of LED modules may be offered in different colors, and may have a specified number of modules per linear foot or other unit length.

Each module may have an adhesive back to assist in mounting the module. In place of or in addition to the adhesive, the module may be mounted using screws or other fasteners in the notches.

The high voltage constant current LED supply according to the invention, unlike the conventional parallel LED system having a ballasting means, does not require any ballasting of individual LEDs, as the current is controlled by the low loss switch mode power supply. The high voltage constant current LED system according to the invention avoids the manufacturing costs of providing a ballasting means, and is also more efficient to operate than the low voltage high current parallel LED system.

The present invention also provides a ground fault interruption (GFI) circuit to be used in combination with the LED modules connected in a serial string.

Figure 3A:
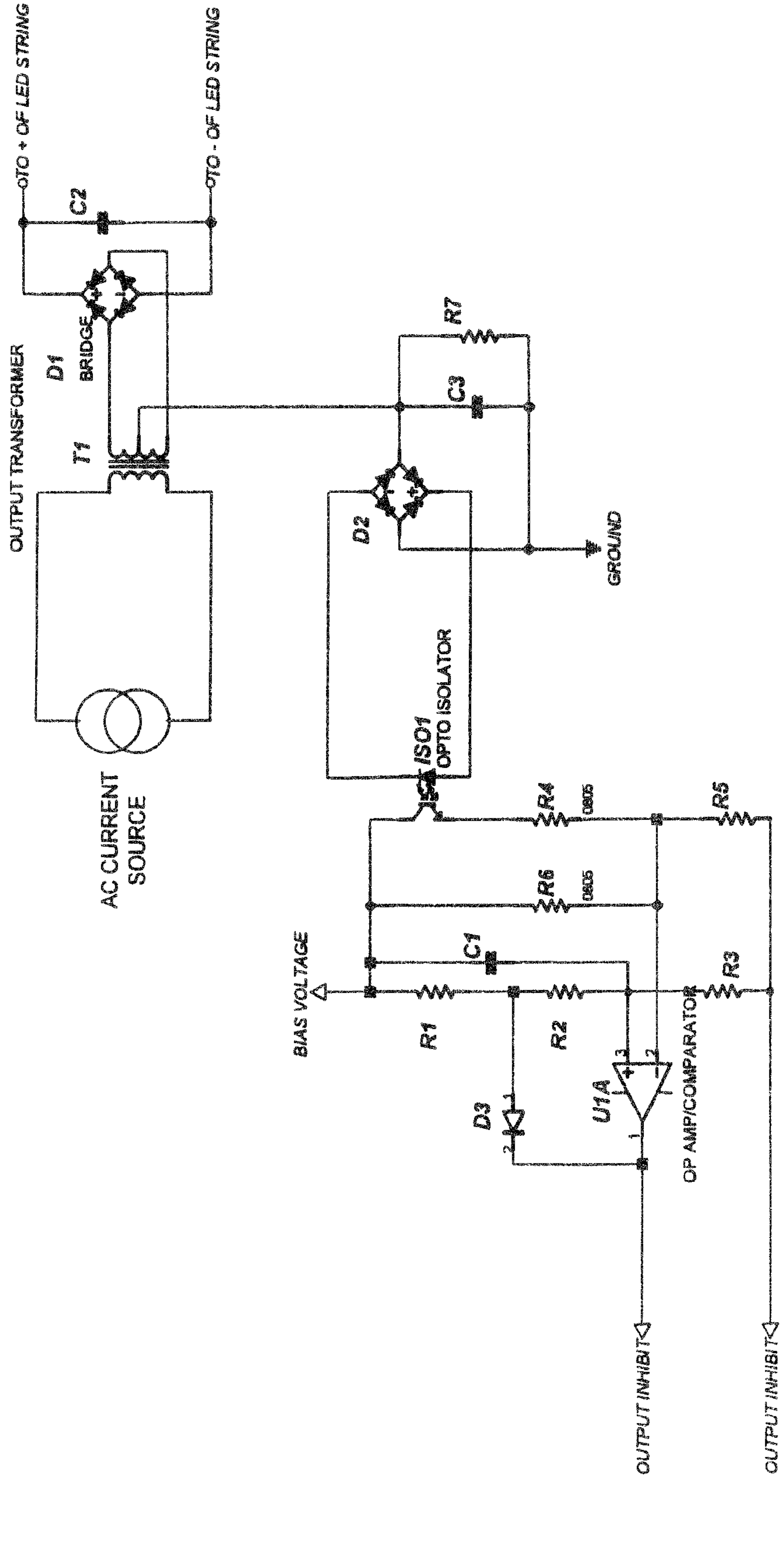
FIG. 3A is a circuit diagram of an embodiment of a circuit for driving serially connected LEDs with shunts for each LED, the circuit having GFI protection.

FIG. 3A shows an embodiment of a GFI circuit according to the invention. The GFI circuit comprises an output transformer T1 connected to receive a constant current source across its primary windings. The output of the transformer T1 is provided to a full wave rectifier bridge D1 which provides a DC signal to the two lines to the + and − terminals of the LED string. The transformer T1 also has a center tap which is connected to ground through bridge rectifier D2, the output of which drives the input of opto isolator IS01. Accordingly, the + and − outputs from D2 and the transformer T1 are balanced about ground.

In the normal operation, there will be negligible current flowing from the center tap of T1 through the bridge rectifier D2. However, in the event of a ground fault from either the + or − line feeding the LED string, current will flow through the center tap of T1 through the bridge rectifier D2. This current is full wave rectified by rectifier bridge D2, and the resulting DC current then flows through the input diode of the opto isolator IS01. Resistors convert the output current of the opto isolator to a voltage, which is then fed to the inverting input of a comparator circuit. The other input of the comparator is fed with a reference voltage via resistor R1. In the event of a ground fault, the output of the opto isolator will pull the inverting input above the reference voltage on the non-inverting input, and the output of the comparator will then go low. Diode D3 will then conduct and lower the voltage on the non-inverting input below that of the inverting input. This will then cause the output of the comparator U1 to latch into the low condition, producing an output inhibit signal which may be used to shut down the output of the power supply of AC current source inputted to output transformer T1.

This in turn will inhibit the output of the power supply. The constant current power supply may, for example, provide a current of in excess of 0.12 amps to the string of LED modules, and the compliance voltage may be as high as 400 VDC balanced about ground, depending on the number of modules in the string. This voltage and current are similar to that encountered in fluorescent lamp ballasts. Embodiments of an LED module and an embodiment of a driving circuit for driving LED modules connected in series and for providing ground fault circuit protection have been described, but the invention is not limited to these embodiments and is defined only by way of the following claims.

We claim:

1. An LED lighting system, comprising:

a source of DC constant current for outputting DC current;

a LED circuit having a plurality of LEDs connected in series and connectable to the source of DC constant current; and a ground fault detecting circuit for detecting the presence of a ground fault condition in the LED circuit, and in response to a ground fault condition being detected, for producing an inhibit signal for disabling the source of constant current from outputting current to drive the LED circuit.

2. The LED lighting system according to claim 1, wherein the LEDs are connected with double insulated wire.

3. An LED driving protection circuit for providing ground fault protection for a series LED circuit, comprising:

an output circuit for outputting power in the form of DC constant current to drive an LED circuit of series connected LEDs and for outputting a output voltage signal at a reference voltage potential, said voltage potential remaining substantially constant in the absence of a ground fault in the LED circuit, but which changes from the reference voltage potential if a ground fault exists in the LED circuit; and a comparator circuit for detecting when the output voltage signal changes from the reference voltage potential, and in response produces an inhibit signal which disables the output circuit from outputting DC constant current to drive the LED circuit.

4. The circuit according to claim 3, wherein the output circuit comprises a first transformer having a primary terminal connected to receive an AC current source, secondary terminals, and a rectifier bridge connected to the secondary terminals for outputting DC power to drive the LED circuit, said first transformer having an output center tap for providing the reference voltage potential.

5. The circuit according to claim 4, wherein the comparator circuit comprises:

a bridge rectifier for producing rectified current;

an opto isolator to receive the rectified current;

a comparator connected to an output of the opto isolator and the reference voltage potential, and for outputting the inhibit signal when the voltage from the secondary terminals exceeds the reference voltage potential.

* * * * *